United States Patent
Wien et al.

(10) Patent No.: US 12,268,117 B2
(45) Date of Patent: *Apr. 8, 2025

(54) SPREADING MACHINE

(71) Applicant: AMAZONEN-WERKE H. DREYER SE & CO. KG, Hasbergen (DE)

(72) Inventors: Thomas Wien, Stuhr (DE); Jan-Eike Lübben, Edewecht (DE); Roland Arnold, Ganderkesee (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,474

(22) Filed: Mar. 8, 2024

(65) Prior Publication Data

US 2024/0237570 A1     Jul. 18, 2024

Related U.S. Application Data

(63) Continuation of application No. 17/914,291, filed as application No. PCT/EP2021/058520 on Mar. 31, 2021, now Pat. No. 11,925,136.

(30) Foreign Application Priority Data

Apr. 3, 2020   (DE) ...................... 10 2020 109 343.8

(51) Int. Cl.
    *A01C 7/08*       (2006.01)
    *A01C 7/04*       (2006.01)
    *A01C 7/06*       (2006.01)

(52) U.S. Cl.
    CPC .............. *A01C 7/081* (2013.01); *A01C 7/042* (2013.01); *A01C 7/06* (2013.01)

(58) Field of Classification Search
CPC .. A01C 7/081; A01C 7/06; A01C 7/08; A01C 7/00; A01C 7/042; A01C 7/04
See application file for complete search history.

(56) References Cited

U.S. PATENT DOCUMENTS

| 11,925,136 B2* | 3/2024 | Wien .................. A01C 7/06 |
| 2015/0189827 A1 | 7/2015 | Gilstring |

(Continued)

FOREIGN PATENT DOCUMENTS

| DE | 102016204433 A1 | 9/2017 |
| DE | 102017216623 A1 | 4/2018 |

(Continued)

OTHER PUBLICATIONS

International Search Report of the International Searching Authority in related PCT patent application PCT/EP2021/058520 prepared by the European Patent Office and mailed Jun. 21, 2021, English translation provided.

(Continued)

*Primary Examiner* — Christopher J. Novosad
(74) *Attorney, Agent, or Firm* — Hassan Abbas Shakir; Shakir Law PLLC

(57) ABSTRACT

A spreading machine, in particular a precision seed drill, includes at least one seed hopper, at least one fertilizer tank, and several spreading units. Each of the spreading units includes at least one pneumatically operated separating device, to or from which a separation air flow is suppliable or dischargeable, and a fertilizer application device. The spreading machine includes a conveying air-driven seed feeding device for providing seed from the seed hopper to the spreading units, and an energy-powered fertilizer supply device for providing fertilizer to the fertilizer application devices. To refine a spreading machine that includes a plurality of consumers, the spreading machine includes at least two separate energy suppliers, in particular blowers or (Continued)

pumps, for providing the separation air flows to the separating devices, the conveying air to the seed feeding device, and the energy to the fertilizer supply device.

12 Claims, 2 Drawing Sheets

(56) References Cited

U.S. PATENT DOCUMENTS

| | | | |
|---|---|---|---|
| 2016/0050842 A1 | 2/2016 | Sauder et al. | |
| 2020/0053955 A1 | 2/2020 | Borkgren et al. | |

FOREIGN PATENT DOCUMENTS

| | | | |
|---|---|---|---|
| DE | 202012013691 U1 | 8/2019 | |
| DE | 202019107077 U1 | 1/2020 | |

OTHER PUBLICATIONS

Written Opinion of the International Searching Authority in related PCT patent application PCT/EP2021/058520 prepared by the European Patent Office and mailed Jun. 21, 2021, English translation provided.

Search Report in related German patent application DE 10 2020 109 343.8 prepared by the German Patent & Trademark Office (DPMA) mailed Dec. 14, 2020, partial machine translation provided.

International Preliminary Report on Patentability in related PCT patent application PCT/EP2021/058520 prepared by the European Patent Office and mailed Jun. 30, 2022.

Office Action in related Eurasian Patent Application 202393426 issued by the Eurasian Patent Office dated Feb. 6, 2024, 3 pgs, machine translation provided, three references cited and previously disclosed.

Translation of the International Preliminary Report on Patentability in related PCT patent application PCT/EP2021/058520 prepared by the European Patent Office and mailed Jun. 30, 2022.

Annex of to International Preliminary Report on Patentability in related PCT patent application PCT/EP2021/058520 prepared by the European Patent Office and mailed May 18, 2022.

Office Action of related Eurasian Patent Application No. 202292759 issued by the Euroasian Patent Office and dated Apr. 24, 2023, 2 pgs, translation provided.

Office Action in Canadian Patent Application No. 3,170,309 prepared by the Canadian Intellectual Property Office and dated Nov. 7, 2023, 5 pgs. Reference cited therein previously cited and considered.

* cited by examiner

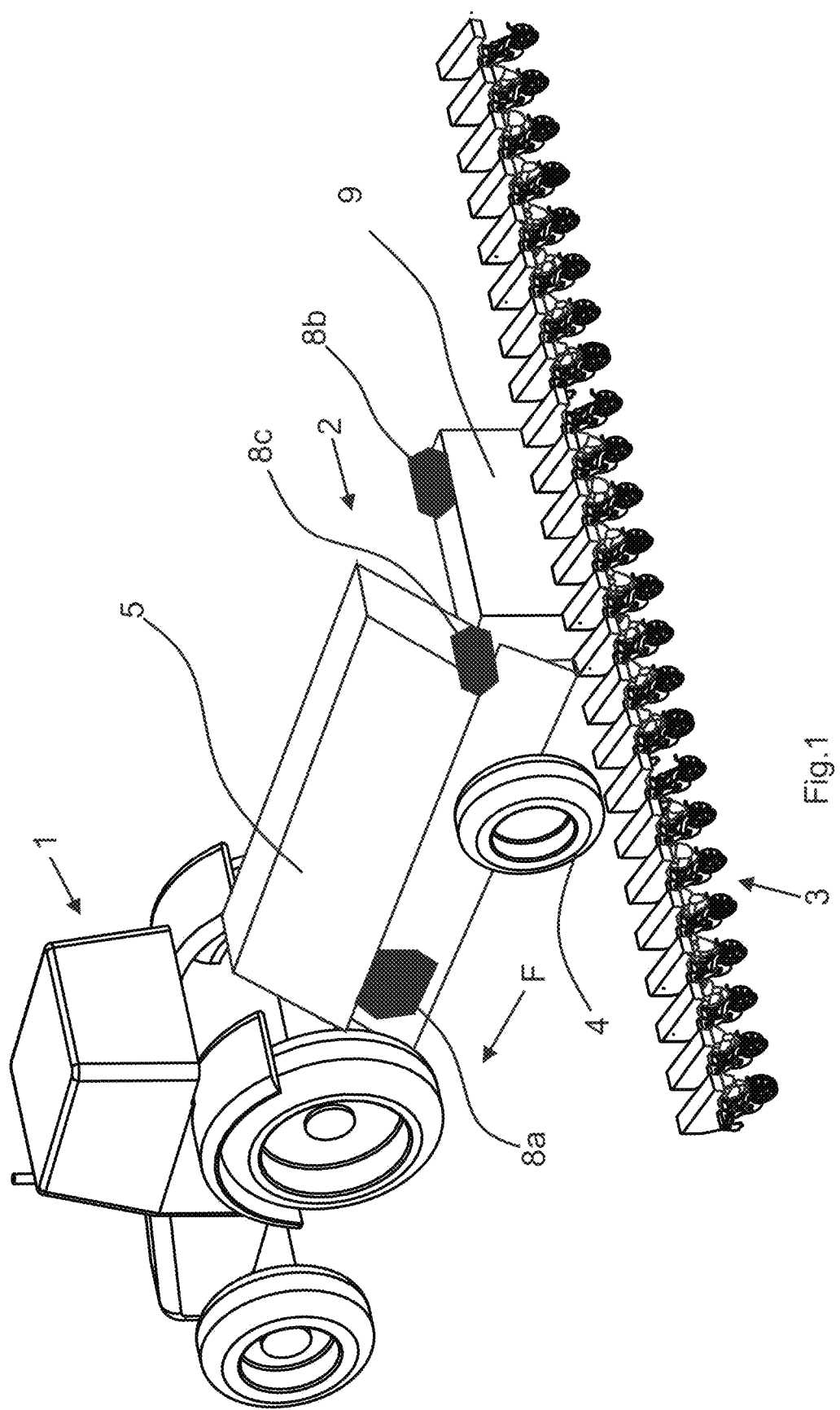

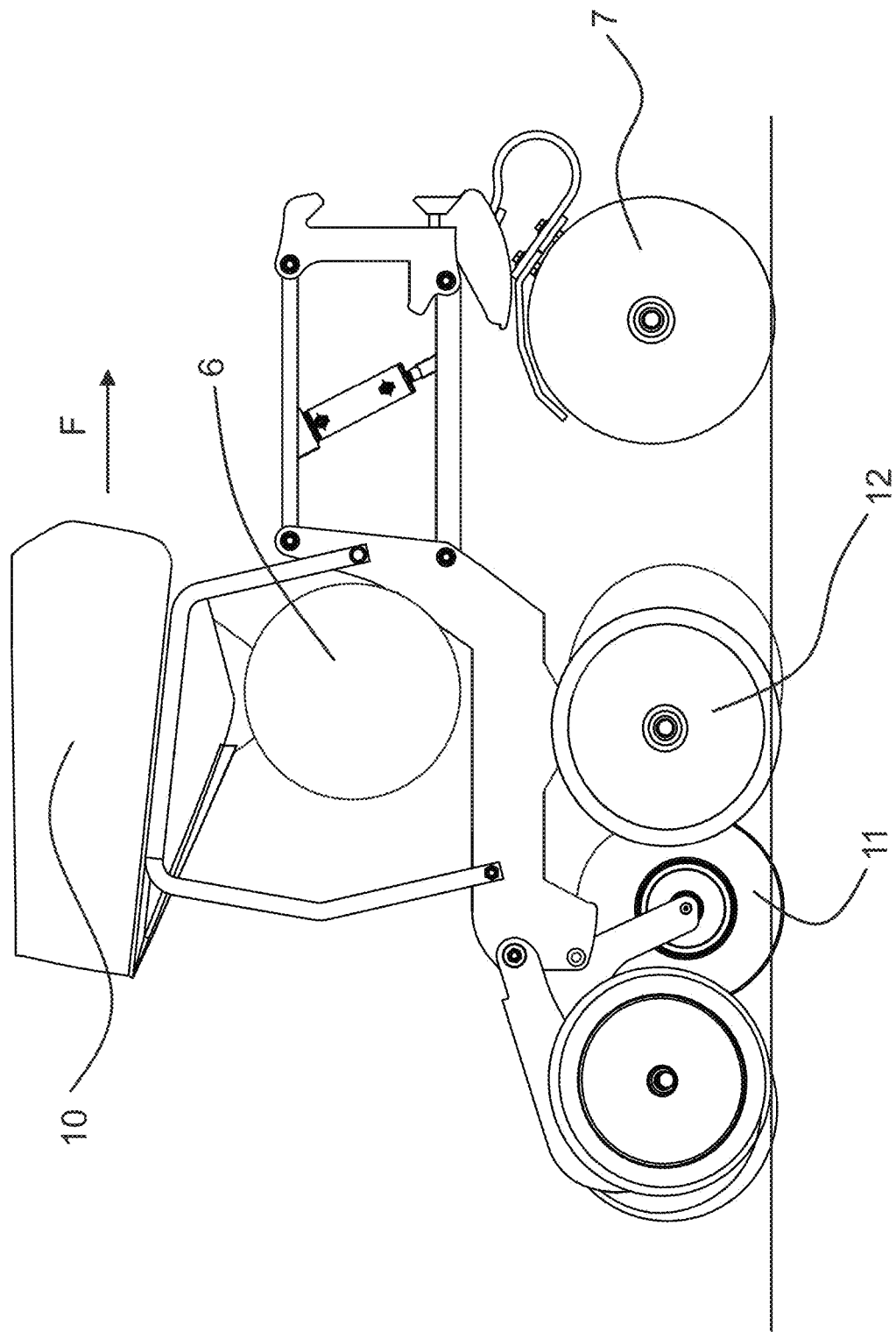

SPREADING MACHINE

CROSS-REFERENCE TO RELATED APPLICATIONS

This application is a continuation of and claims priority to patent U.S. Ser. No. 17/914,291 filed 23 Sep. 2022, which is pending and which is hereby incorporated by reference in its entirety for all purposes.

This application is a national stage under 35 U.S.C. § 371 of PCT patent application PCT/EP2021/058520 filed on 31 Mar. 2021, which is hereby incorporated by reference in its entirety for all purposes.

PCT patent application PCT/EP2021/058520 claims priority to German Patent Application DE 10 2020 109 343.8 filed on 3 Apr. 2020, which is hereby incorporated by reference in its entirety for all purposes.

BACKGROUND OF THE INVENTION

1. Field of the Invention

The invention relates to a spreading machine used in agriculture. More particularly, the invention is directed to a spreading machine used in agriculture, wherein the spreading machine is a precision seed drill wherein each of the spreading units includes at least one pneumatically operated separating device to or from which a separation air flow is suppliable or dischargeable.

2. Discussion of the Related Art

These types of spreading machines, in particular designed as precision seed drills, are well known, and typically include various components or consumers that require the provision of energy in the form of compressed air or hydraulic pressure means. Examples of such components or consumers are separating devices, which require a separation air flow for separating seed, seed feeding devices, which for the separation supply the separating devices with seed from a central seed hopper via a conveying air flow, and fertilizer supply devices, which convey granular fertilizer via conveying air, or liquid fertilizer by means of a pump. The pneumatically operated separating devices, to/from which the separation air flow is suppliable or dischargeable, operate in a manner known per se: In the case of a separating device operated under positive pressure, the separation air flow is acted on with positive pressure from a blower, so that the seed in separated form is pressed against a separation element that is encapsulated in the separating device, and may thus be separated; in the case of a separating device operated under negative pressure, the separation air flow is acted on with negative pressure from a blower, so that it is suctioned from the separating device, and with a suitable arrangement of the separation element may likewise be utilized for the separation. A seed feeding device is routinely used when seed hoppers that are not very bulky are situated on spreading units of the spreading machine: The seed feeding device conveys seed from the central, bulky seed hopper via piping, with the aid of the conveying air flow that is to be generated by a blower, to the individual separating devices, so that the conveying air flow is divided into individual conveying streams to the number of separating devices. Generic spreading machines also typically include a fertilizer supply device in order to spread fertilizer in addition to the seed: The fertilizer supply device is configured to convey, by means of a blower or a pump, granular or liquid fertilizer to fertilizer application devices of the spreading units via a corresponding line system.

In spreading machines known thus far, all of these components or consumers are operated using a single energy supplier, designed as a blower or pump, which results in low energy efficiency and interfunctional dependencies of the components or consumers. Thus, for operating the separating devices, the seed feeding device, and the fertilizer supply device, it may be necessary to operate the blower, which is used as an energy supplier, at high power, while the resulting conveying stream for individual functions is to be throttled. This results in inadequate energy efficiency. In addition, all connected consumers are thus mutually dependent on the total power provided by the energy supplier on the one hand, and by the portion of power that is withdrawn by the individual consumers, which makes targeted control of the individual components more difficult.

SUMMARY OF THE INVENTION

The object underlying the invention, therefore, is to refine a spreading machine including multiple consumers, and to avoid the known disadvantages. In particular, the intent is to increase the energy efficiency and to improve the controllability of the energy provided to the consumers.

This object is achieved according to the invention by a spreading machine having the features of a spreading machine, in particular a precision seed drill, comprising at least one seed hopper, at least one fertilizer tank, and a plurality of spreading units, each of the spreading units including at least one pneumatically operated separating device, to or from which a separation air flow is suppliable or dischargeable, and a fertilizer application device, the spreading machine including a conveying air-driven seed feeding device for providing seed from the seed hopper to the spreading units, and an energy-powered fertilizer supply device for providing fertilizer to the fertilizer application devices, characterized in that the spreading machine includes at least two separate energy suppliers, in particular blowers or pumps, for providing the separation air flows to the separating devices, the conveying air to the seed feeding device, and the energy to the fertilizer supply device.

According to the invention, it is provided that the spreading machine includes at least two separate energy suppliers, in particular blowers or pumps, for providing the separation air flows to the separating devices, the conveying air to the seed feeding device, and the energy to the fertilizer supply device. The invention makes use of the finding that the use of at least two separate energy suppliers provides the option to advantageously operate consumers, i.e., separating devices, the seed feeding device, and the fertilizer supply device, having similar operating behaviors, using one energy supplier, while the respective other consumer is operable by use of a separate energy supplier. Due to this measure, the energy efficiency of the spreading machine is increased, since during operation of consumers having similar operating behaviors, less energy remains unutilized, i.e. is more energy efficient, and a further consumer may be operated completely independently. In addition, the controllability of the provided energy is improved, since the separate energy suppliers may preferably be operated independently of one another at different power levels. Thus, the functions of separating devices, seed feeding, and fertilizer supply are also less dependent, as the result of which an improved work result is achievable.

In one advantageous refinement of the invention, it is provided that in each case at least one of the separate energy suppliers for providing the separation air flows to the separating devices and the conveying air to the seed feeding device on the one hand, and at least one other of the separate energy suppliers for providing the energy to the fertilizer supply device on the other hand, are provided. The advantage of jointly providing the energy to the separating devices and to the seed feeding device by one of the separate energy suppliers, which preferably is designed as a blower, is that during normal operation these two consumers may be very easily and appropriately coordinated with one another. In contrast, the fertilizer supply device is independently connectable and disconnectable to allow a surface area-specific fertilizer application without influencing the seed-related functions.

In one alternative refinement of the invention, it is provided that in each case at least one of the separate energy suppliers for providing the energy to the fertilizer supply device and the conveying air to the seed feeding device on the one hand, and at least one other of the separate energy suppliers for providing the separation air flows to the separating devices on the other hand, are provided. As a result of this measure, the energy supplier for providing the separation air flows may be adapted to the use of separating devices operated under negative pressure or positive pressure in a particularly simple manner.

In a further alternative refinement of the invention, it is provided that in each case at least one of the separate energy suppliers for providing the energy to the fertilizer supply device and the separation air flows to the separating devices on the one hand, and at least one other of the separate energy suppliers for providing the conveying air to the seed feeding device on the other hand, are provided. As a result of this measure, the spreading machine has independently adjustable product loading by use of the seed feeding device.

The spreading machine according to the invention is also advantageously refined in such a way that it includes a separate energy supplier for respectively providing the separation air flows to the separating devices, the conveying air to the seed feeding device, and the energy to the fertilizer supply device. As the result of a separate energy supplier being associated with each of the consumers, i.e., the separating devices, the seed feeding device, and the fertilizer supply device, the energy suppliers, i.e., the blower and/or pump, may be operated with a suitable power output. This refinement of the spreading machine thus has a particularly high energy efficiency. In addition, each supplier may be provided with the power that is required for its in particular instantaneous operating behavior, so that interfunctional dependencies no longer exist, and the work result is advantageously improved.

In a further advantageous refinement of the spreading machine, the separate energy suppliers are controllable independently of one another, preferably via their rotational speed. The spreading machine may include a control device for this purpose. The control device is connected to the energy suppliers in a signal-conducting manner, and may be part of a display device and/or operating device. The control device may likewise be a computer unit that is connected to the display device and/or operating device, preferably in a signal-conducting manner. Alternatively or additionally, the separate energy suppliers are controllable via a throttle.

The spreading machine according to the invention is also advantageously refined in such a way that a separation air flow and a conveying air flow of the seed feeding device are combinable in the separating device. For the case that the separating device is operated with positive pressure, a portion of the separation air flow may thus be advantageously provided by the conveying air flow. It is particularly advantageous that the blower for providing the separation air flow is thus operable at a lower power level.

To protect the environment during operation of the spreading machine, in one further advantageous refinement it is provided that conveying air of the seed feeding device is dischargeable by means of a separating device. Since the seed is generally treated with environmentally harmful seed dressings which are released during the transport between the seed hopper and the separating device and which may be entrained by the conveying air, as a result of this refinement the conveying air may preferably be discharged close to the ground. The discharge, in particular close to the ground, of conveying air that is loaded with seed dressings protects insects in the surroundings of the spreading machine, and is thus beneficial to the environment.

A further advantageous refinement of the spreading machine according to the invention is characterized in that the separating device includes a seed delivery channel for the separate delivery of seed, the separated seed in the seed delivery channel being accelerated by the separation air flow and/or at least partially by the conveying air of the seed feeding device. After detachment by a separation element of the separating device, such as a singling disc, a separated seed is delivered into the seed delivery channel. The separating device may thus be designed in such a way that the separation air flow and the conveying air are at least partially led into the seed delivery channel, so that the separated seeds therein are accelerated compared to the delivery in free fall. This refinement has particular synergy with the provision of the separation air and/or the conveying air via separate energy suppliers, since the overall air flow that is available for accelerating the seed is thus controllable in a particularly simple and advantageous manner. In addition, the acceleration or velocity of the seed is adapted to different seeds and/or travel speeds in a particularly simple manner.

The spreading machine according to the invention is also advantageously refined in such a way that the separating device includes a seed delivery channel for the separate delivery of seed; the seed that is separated, in particular accelerated in the seed delivery channel, is deceleratable by means of an energy reduction element in the seed delivery channel and/or in the region of the delivery from the seed delivery channel, so that the separated seed may be deposited equidistantly. The quality of the deposition may be improved by decelerating the separated seed from a high intrinsic velocity. The separated seeds are preferably decelerated by the energy reduction element to at least approximately the travel speed of the spreading machine, thus enabling deposition, to the greatest extent possible without the seed rolling away.

In one particularly advantageous refinement of the invention, it is provided that the energy reduction element is designed as a catcher roller, catch lug, brush element, and/or cellular wheel. The catcher roller may be situated in the area of the delivery from the seed delivery channel, after exiting the seed delivery channel the seed being run over by the catcher roller and thus decelerated. The seed is also pressed into the ground by the catcher roller in the manner of a seed pressure roller, which is conducive to the seed emergence. The catch lug may likewise be situated in the area of the delivery from the seed delivery channel, and may be configured in such a way that it grazes and thus decelerates delivered seed. In addition, brush elements and/or cellular wheels may be provided which receive the seed, and via their own circumferential speed decelerate it to the desired level.

BRIEF DESCRIPTION OF DRAWINGS

Further particulars of the invention are apparent from the description of the figures, and the drawings. In the drawings:

FIG. 1 shows a precision seed drill, including a plurality of spreading units, attached behind a tractor in a perspective view, and FIG. 2 shows one of the spreading units in a side view.

DETAILED DESCRIPTION OF THE INVENTION

FIG. 1 shows a spreading machine, designed as a precision seed drill 2 and attached behind a tractor 1, in an oblique perspective view from the rear. At its rear end in the travel direction F, the precision seed drill 2 includes a plurality of spreading units 3, situated transversely with respect to the travel direction F, and in front of same, its own chassis 4. The chassis 4 includes two running tires, situated adjacent to one another and transversely with respect to the travel direction F, and is fastened to a frame part of the precision seed drill 2 that extends essentially in the travel direction F, so that the precision seed drill 2, in the manner of a trailer, may be brought into the shown working position over an agricultural area with the aid of the tractor 1, or may be brought into a transport position over streets and paths. The shown working position of the precision seed drill 2 is characterized in that the spreading units 3, which are fastened to an elongated frame part of the precision seed drill 2, are situated adjacent to one another and transversely with respect to the travel direction F, resulting in a large working width. The precision seed drill 2 is thus configured in particular for working large surface areas, where the seed is deposited separately by use of a pneumatically operated separating device 6 of each spreading unit 3. Each spreading unit 3 also includes a fertilizer application device, designed as a disc coulter 7, for simultaneously spreading fertilizer.

To avoid frequent interruptions in operation for refilling seed of the individual spreading units 3 when working large surface areas, as is known for carried precision seed drills 2, for example, and accordingly to achieve a high impact force, the precision seed drill 2 includes a large-volume seed hopper 5. A seed feeding device is provided for supplying the seed from the seed hopper 5 to the spreading units 3. The seed feeding device distributes the seed from the seed hopper 5 in an adjustable manner to the spreading units 3 via seed lines, not illustrated in greater detail. For this purpose, a pneumatic conveying air flow is used which transports the seed in the seed lines and provides it to the separating devices 6 of the spreading units 3. For this purpose, the precision seed drill 2 includes a separate energy supplier, designed as a seed blower 8a, to generate the conveying air flow. The seed feeding device may also include a metering element that is configured to withdraw seed in an adjustable quantity from the seed hopper 5 and deliver it into the seed lines, not illustrated, where it is captured by the conveying air flow and transported. Alternatively, the seed feeding device may have a self-regulating design, i.e., may have a filling level element that is configured to automatically interrupt the conveying air flow when a predetermined filling level is reached. The seed lines may include shutoff elements, so that adjustments may be made for which of the spreading units 3 is supplied with seed.

When the seed is distributed to the spreading units 3, it is supplied to the separating devices 6, which for this precision seed drill 2 are operated with positive pressure. In each case a separation air flow which is under positive pressure relative to atmospheric pressure is suppliable to the separating devices 6 of each spreading unit 3, and which ensures, in a manner known per se, that individual seeds adhere to a rotatably drivable singling disc of the separating device 6 and are delivered into a seed delivery channel at regular intervals. To provide the separation air flows, the precision seed drill 2 includes a separate energy supplier that is designed as a separating blower 8c. The separating blower 8c is situated on the elongated frame part of the precision seed drill 2 in the travel direction F, and is connected to the separating devices 6 via lines, not illustrated in greater detail. In one embodiment that is not shown, it would be conceivable for the precision seed drill 2 to include multiple separating blowers 8c, and/or for the separating blower(s) 8c to be situated at the elongated frame part, transversely with respect to the travel direction F. The separating blower 8c is controllable independently of the seed blower 8a, i.e., may also be referred to as a separate energy supplier for providing the separation air flows.

The precision seed drill 2 includes a fertilizer tank 9 to also allow fertilizer to be carried along in large quantities. A fertilizer supply device is provided for supplying fertilizer from the fertilizer tank 9 to the fertilizer application devices designed as disc coulters 7. The fertilizer supply device distributes the fertilizer from the fertilizer tank 9 in an adjustable manner to the disc coulters 7 via fertilizer lines, likewise not illustrated in greater detail. In this precision seed drill 2, a pneumatic conveying air flow that is generatable by an energy supplier designed as a fertilizer blower 8b is likewise used for this purpose. The fertilizer blower 8b is controllable independently of the seed blower 8a and the separating blower 8c, i.e., is to be regarded as a separate energy supplier for providing the energy to the fertilizer supply device. As a result, in this precision seed drill 2 the seed blower 8a, the fertilizer blower 8b, and the separating blower 8c are each controllable independently of one another, i.e., are each to be referred to as a separate energy supplier. In one embodiment of the precision seed drill 2 that is not shown, it would be conceivable to operate at least two consumers, i.e., separation air flows or separating devices 6, the seed feeding device, and the fertilizer supply device, using one energy supplier, and to utilize the respective third consumer using a separate energy supplier. The fertilizer supply device may include a metering element for withdrawing fertilizer from the fertilizer tank 9 in adjustable quantities and delivering it into the fertilizer lines.

The arrangements of the seed hopper 5 and the fertilizer tank 9 on the precision seed drill 2 may be interchanged, so that the fertilizer tank 9 is situated in front of the seed hopper in the travel direction F. The volumes of the seed hopper 5 and of the fertilizer tank 9 are essentially freely selectable.

The seed blower 8a, the fertilizer blower 8b, and the separating blower 8c are each controllable independently of one another via their rotational speed. Thus, the seed feeding device, the fertilizer supply device, and the separating devices 6 may be operated independently of one another or without mutually influencing their functioning. For example, the velocity and/or quantity of seed conveyed from the seed hopper 5 to the spreading units 3 is adjustable by means of the seed blower 8a. In this precision seed drill 2, the individual spreading units 3 each include a storage container, used as a seed buffer 10, in which seed, transported from the central seed hopper 5 via the conveying air flow that is generated by the seed blower 8a, to the particular spreading unit 3, collects. The seed then slides from the seed buffer 10 into the separating device 6, as shown in FIG. 2. For this precision seed drill, it is thus conceivable to operate the seed blower 8a at preferably regular intervals, namely, whenever at least one seed buffer 10 is to be supplied with seed. Alternatively, it is conceivable for the seed blower 8a to be continuously operated, but at reduced power, for example, so that a sufficient quantity of seed is always available in each seed buffer 10 for separation by the separating devices 6. In any case, the seed blower 8c may be operated independently of the operating behavior of the fertilizer supply device and the separating devices, at a power level required for the seed feeding device, so that the seed blower operates in a particularly efficient manner.

In one embodiment of the precision seed drill 2 not shown, the spreading units 3 include no seed buffer 10, so that seed that is transported from the seed feeding device is, in a manner of speaking, provided directly to the separating device 6. In this embodiment, by suitable control of the seed blower 8a it may be ensured that enough seed is always present for the separation, due to the fact that the seed blower 8a is separately controllable, i.e., independently of the other energy suppliers 8b, 8c.

The quantity and/or velocity of the fertilizer provided to the disc coulters 7 from the fertilizer tank 9 are/is adjustable by means of the fertilizer blower 8b. In this precision seed drill 2, the seed blower 8a and the fertilizer blower 8b may be advantageously controlled independently of one another, so that the seed feeding device and the fertilizer supply device are adjustable and operable independently of one another. In addition, the separation air flows in the conveyed volume flow or the pressure increase are/is adjustable by means of the separating blower 8c, so that, for example, the pressure difference that is available for the separation by means of the separating devices 6 may be varied. Since the separating blower 8c is also separately controllable, the separation air flows may be adapted independently of the seed feeding device and the fertilizer supply device. This is particularly advantageous, since a separation air flow and a conveying air flow of the seed feeding device are combinable in the separating device 6, and the separation air flow and the conveying air flow are thus adaptable to one another or may be coordinated with one another. In addition, the conveying air of the seed feeding device is dischargeable via the separating device 6, in particular in the direction of the ground being worked.

FIG. 2 shows a spreading unit 3 in the state after being removed from the elongated frame part of the precision seed drill 2 transverse to the travel direction F. The seed that is transported from the seed hopper 5 to the spreading unit 3 by means of the seed feeding device reaches the seed buffer 10 via the seed lines, not illustrated. Seed that is stored in the seed buffer 10 is available to the separating device 6 for the separation, into which the seed may slide down under the influence of the force of gravity and/or the conveying air of the seed feeding system. For the separation, a separation air flow provided by the separating blower 8c is supplied to the separating device 6 via lines, likewise not illustrated. After the seed has been separated with the aid of a singling disc, for example, it is removed into the seed delivery channel. The separation air flows and conveying air flows of the seed feeding device that are combined in the separating device 6 exit, at least in part, via the seed delivery channel and accelerate removed, separated seeds therein. In a manner known per se, using soil cultivation tools 12 which cover the seed delivery channel, a furrow is opened in the ground, into which the separated seeds are ejected from the seed delivery channel. The seed delivery channel thus extends from the separation element of the separating device 6 to the area of the soil cultivation tools 12. To prevent the seeds from rolling away in the furrow, the seeds may be decelerated using an energy reduction element designed as a catcher roller 11. The seed delivery channel in the area of the delivery is configured in such a way that the seed may be ejected into a gap between the catcher roller 11 and the furrow, so that the separated seed is deposited equidistantly. In addition to the seed, fertilizer conveyed from the fertilizer tank 9 by means of the fertilizer blower 8b may be deposited via the disc coulter 7.

LIST OF REFERENCE SYMBOLS 1 tractor
2 precision seed drill
F travel direction
3 spreading unit
4 chassis
5 seed hopper
6 separating device
7 disc coulter
8a seed blower
8b fertilizer blower
8c separating blower
9 fertilizer tank
10 seed buffer
11 catcher roller
12 soil cultivation tools

What is claimed is:

1. A spreading machine for precision seed drilling, the spreading machine comprising:
   a seed hopper;
   a fertilizer tank;
   a plurality of spreading units, each of the plurality of spreading units comprising:
      a pneumatically operated separating device operating with positive pressure, a separation air flow being supplied to the pneumatically operated separating device, and
      a fertilizer application device;
   conveying air-driven seed feeding device for providing seed from the seed hopper to the plurality of spreading units, wherein the separation air flow and a conveying air flow of the conveying air-driven seed feeding device are combinable in the respective pneumatically operated separating devices;
   an energy-powered fertilizer supply device for providing fertilizer to the fertilizer application devices;
   a plurality of separate energy suppliers for providing the separation air flow to the respective pneumatically operated separating devices, the conveying air to the conveying air-driven seed feeding device, and energy to the energy-powered fertilizer supply device;
   a seed delivery channel for a delivery of the seed; and
   a catcher roller arranged within a delivery area of the seed delivery channel and configured such that the seed is run over by the catcher roller to decelerate the seed.

2. The spreading machine according to claim 1, wherein the plurality of separate energy suppliers comprises:
   a first energy supplier for providing the separation air flow to the pneumatically operated separating devices,
   a second energy supplier for providing the conveying air to the conveying air-driven seed feeding device, and
   a third energy supplier for providing energy to the energy-powered fertilizer supply device.

3. The spreading machine according to claim 1, wherein the plurality of separate energy suppliers consists of:

a first energy supplier for providing the conveying air to the conveying air-driven seed feeding device and for providing energy to the energy-powered fertilizer supply device; and a second energy supplier for providing the separation air flows to the pneumatically operated separating devices.

4. The spreading machine according to claim 1, wherein the plurality of separate energy suppliers consists of:

a first energy supplier for providing the separation air flows to the pneumatically operated separating devices and for providing energy to the energy-powered fertilizer supply device, and a second energy supplier for providing the conveying air to the conveying air-driven seed feeding device.

5. The spreading machine according to claim 1, wherein the plurality of separate energy suppliers are controllable independently of one another via their respective rotational speed.

6. The spreading machine according to claim 1, wherein the conveying air of the conveying air-driven seed feeding device is dischargeable by means of the pneumatically operated separating device.

7. The spreading machine according to claim 1, wherein the separated seed in the seed delivery channel is accelerated by the separation air flow or at least partially by the conveying air of the conveying air-driven seed feeding device.

8. The spreading machine according to claim 1, wherein the plurality of separate energy suppliers are controllable independently of one another via a throttle.

9. The spreading machine according to claim 1, wherein the spreading machine is a precision seed drill.

10. The spreading machine according to claim 1, further comprising a blower for providing the separation air flow.

11. A spreading machine for precision seed drilling, the spreading machine comprising:

a seed hopper;

a fertilizer tank;

a plurality of spreading units, each of the plurality of spreading units comprising:
a pneumatically operated separating device operating responsive to a separation air flow, and
a fertilizer application device;

a conveying air-driven seed feeding device for providing seed from the seed hopper to the plurality of spreading units, wherein the separation air flow and a conveying air flow of the conveying air-driven seed feeding device are combinable in the respective pneumatically operated separating devices;

an energy-powered fertilizer supply device for providing fertilizer to the fertilizer application devices;

a plurality of separate energy suppliers for providing the separation air flow to the respective pneumatically operated separating devices, the conveying air to the conveying air-driven seed feeding device, and energy to the energy-powered fertilizer supply device;

a seed delivery channel for a delivery of the seed; and a catcher roller configured such that the seed is run over by the catcher roller to decelerate the seed after exiting the delivery channel.

12. The spreading machine according to claim 11, further comprising a blower for providing the separation air flow.

* * * * *